United States Patent
Lipnevicius

(10) Patent No.: US 6,942,139 B2
(45) Date of Patent: Sep. 13, 2005

(54) ROBOTIC CYLINDER WELDING

(75) Inventor: Geoff M. Lipnevicius, Flushing, MI (US)

(73) Assignee: Lincoln Global, Inc., Monterey Park, CA (US)

(*) Notice: Subject to any disclaimer, the term of this patent is extended or adjusted under 35 U.S.C. 154(b) by 162 days.

(21) Appl. No.: 10/425,305

(22) Filed: Apr. 29, 2003

(65) Prior Publication Data

US 2004/0217096 A1 Nov. 4, 2004

(51) Int. Cl.⁷ ................................................ B23K 1/14
(52) U.S. Cl. ...................................... 228/102; 228/49.1
(58) Field of Search ...................... 228/102, 47.1–49.1, 228/49.2, 212, 213, 184; 700/254, 258; 901/42

(56) References Cited

U.S. PATENT DOCUMENTS

| | | | |
|---|---|---|---|
| 4,458,321 A | * | 7/1984 | Whitney et al. ............ 700/258 |
| 4,504,728 A | * | 3/1985 | Ukai et al. ............... 219/125.1 |
| 4,568,816 A | * | 2/1986 | Casler, Jr. ............... 219/124.34 |
| 4,629,109 A | * | 12/1986 | Matsushita ................. 228/49.1 |
| 5,001,326 A | | 3/1991 | Stava |
| 5,360,157 A | | 11/1994 | Gilbert et al. |
| 5,676,857 A | | 10/1997 | Parker |
| 5,961,863 A | | 10/1999 | Stava |
| 6,036,082 A | | 3/2000 | Caldarone |
| 6,051,810 A | | 4/2000 | Stava |
| 6,118,093 A | | 9/2000 | Hong |
| 6,204,478 B1 | | 3/2001 | Nicholson et al. |
| 6,212,443 B1 | * | 4/2001 | Nagata et al. ............... 700/245 |
| 6,278,074 B1 | | 8/2001 | Morlock et al. |
| 6,343,297 B1 | | 1/2002 | D'Anjou et al. |
| D460,073 S | | 7/2002 | Whitehorn et al. |
| D462,685 S | | 9/2002 | Yamamoto et al. |
| 6,462,731 B1 | | 10/2002 | Stoffers et al. |
| 6,501,049 B2 | | 12/2002 | Stava |

* cited by examiner

*Primary Examiner*—Jonathan Johnson
(74) *Attorney, Agent, or Firm*—Fay, Sharpe, Fagan, Minnich & McKee, LLP

(57) ABSTRACT

A first embodiment of the present application is directed to a method and system used to weld a cylindrical workpiece. A substantially cylindrical workpiece is loaded into a workpiece support, and a robotic welding arm is positioned located at a start position. A value representing a size of the cylindrical workpiece is input into a robot controller via a system interface. Inputting of the size value to the robotic interface obtains a control program. Operation of the obtained control program is initiated by an operator, causing the robot arm to move a preprogrammed distance toward a work surface of the workpiece. Then a welding process is performed by the welder carried on the robot arm in accordance with the control program. The process includes initiating operation of the welder, and moving the welder in a pattern appropriate for the welding operation. The workpiece and welder are moved relative to each other so as to perform the welding process as determined by the control program.

25 Claims, 12 Drawing Sheets

REGRESSION PLOT
TOTAL TIME = 67.3598
+33.8308 NOMINAL PIPE
+5.67906 NOMINAL PIPE ++2

ROBOTIC CYLINDER WELDING

INCORPORATION BY REFERENCE

Incorporated by reference are U.S. Pat. Nos. 5,001,326, 5,961,863 and 6,051,810 related to improvements in welding processes. Further incorporated are U.S. Pat. Nos. 6,036,082 and 6,278,074 directed to robotic welding apparatuses, and U.S. Pat. Nos. 5,676,857 and 6,204,478, directed to methods of pipe welding.

The present application relates to the art of welding and, more particularly, to a robotic welding system designed to efficiently weld a cylindrical workpiece.

BACKGROUND OF THE INVENTION

The use of robotics to perform welding operations is well known. Typically, robots are used to increase production and/or to reduce human exposure to harsh and/or undesirable working conditions. Such systems may include an arc welding robot which moves a welder toward an object which is fixed to a welding jig. The system welds the object while moving the object and/or the welder. A control program controlling the movement of the robot, operates on the basis of certain stored input parameters, such as the type of welding object, geometric data of the welding portion, the depth of penetration, and the starting and termination points of the welding. Certain welding conditions which may be considered in the creation of the control program include welding current, welding voltage, distance between the welder and the welding object, speed of supplying a wire, as well as a relative velocity of the welder and the welding object. In an open-loop control system these welding parameters are applied without any alteration during the welding operation.

The inability to alter the welding process in an open-loop system has in certain situations been considered a drawback. Therefore robotic systems have been designed to include feedback control in order to alter the welding process during the welding operation. For example, U.S. Pat. No. 6,118,093, hereby incorporated by reference in its entirety, proposes a closed-loop design where real-time changes of welding conditions such as a welding voltage, welding current, welding speed and the like are performed without interruption of welding operation. These changes are achieved by the use of a temperature detection process, used to generate feedback data to a controller. Adjustments are made to the welding process dependent on the feedback data.

Other closed-loop robotic welding systems incorporate vision capabilities. In one example, a laser directs its beam across the seam of a welding area to generate a feed back signal for the robotic controller. Based on this feedback signal, adjustments to the welding operation are undertaken. For example, movement of the welding torch is adjusted based on the provided information.

The exemplary described robotic systems have various drawbacks. Specifically, with regard to existing open-loop robotic systems, the control programs are customized to operate for a specifically sized and shaped workpiece. To obtain an economic benefit when using these types of welding systems, a large number of the identically configured and sized workpieces must be batch processed. When another sized workpiece is to be welded, a separate unique customized control program must be created. Attempting to weld a workpiece using a control program created for a different sized workpiece will result in defective welding due to misplacement of the welder. Thus, existing open-loop welding systems do not provide, economical process to weld a number of differently sized cylindrical workpieces, where such a system is able to economically weld part-volumes as small as a single part.

On the other hand, while robotic systems having a closed-loop design permit for alterations to the welding process dependent upon existing conditions, the inclusion of these feedback systems greatly complicate and increase the cost of the welding systems. For example, a laser vision system incorporated with the robotic arm, may cost as much as the robotic system itself. Thus, the cost of adding feedback controls to alter a welding procedure creates economic inefficiencies when attempting to weld small numbers of workpieces. The economic benefit of automating the welding process is therefore offset by the high cost of incorporating the components needed for a closed-loop system.

A further drawback of existing robotic systems, is their failure to address the ability to weld two cylindrical workpieces not completely in the same horizontal plane. More specifically, in robotic welding, it has been defined that the cylindrical workpiece is rotated 360° while being welded. However, existing systems apparently only address the welding of two cylindrical workpiece portions which are in the same horizontal plane.

Another drawback in existing robotic systems, is the inability to provide for operator interaction during the welding process, which permits for refined operator control of the location of the welder, even while the welding control program is functioning.

In view of the foregoing problems and shortcomings of existing cylindrical robotic welding systems, the present application describes a method and apparatus to overcome these shortcomings, and provide an improved cylindrical robotic welding system.

SUMMARY OF THE INVENTION

A first embodiment of the present application is directed to a method and system used to weld a cylindrical workpiece. A substantially cylindrical workpiece is loaded into a workpiece support, and a robotic welding arm is positioned located at a start position. A value representing a size of the cylindrical workpiece is input into a robot controller via a system interface. Inputting of the size value to the robotic interface obtains a control program. Operation of the obtained control program is initiated by an operator, causing the robot arm to move a preprogrammed distance toward a work surface of the workpiece. Then a welding process is performed by the welder carried on the robot arm in accordance with the control program. The process includes initiating operation of the welder, and moving the welder in a pattern appropriate for the welding operation. The workpiece and welder are moved relative to each other so as to perform the welding process as determined by the control program.

In accordance with another aspect of the present application, the control program is one of a plurality of control programs stored in the robot controller, wherein the plurality of control programs correspond to different sizes of workpieces.

In accordance with another aspect of the present application, the control programs corresponding to different sizes of the workpieces include different welding speeds at which the welding process proceeds.

In accordance with still another aspect of the present application, the workpiece support includes a motor for rotating the workpiece, where the motor is integrated within the robot controller, wherein operation of the motor is controlled by the control program.

In accordance with still yet another aspect of the present application, the control program is a single control program stored in the robot controller, wherein inputting of a particular size of workpiece causes the control program to be loaded with values to replace variables within the control program, such replacement customizing the control program for the selected size.

Turning to still yet another aspect of the present application, the method is provided for manipulating the location of the welding torch via a manipulation control mechanism while the welding procedure is being performed.

With attention to still yet another aspect of the present invention, the workpiece support is positioned to permit the welding of a first cylindrical workpiece portion and a second cylindrical workpiece portion, where the second cylindrical workpiece portion includes a section in a plane substantially different from the plane of the first horizontal cylindrical workpiece portion.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

PREFERRED EMBODIMENT OF THE PRESENT APPLICATION

Figure 1:
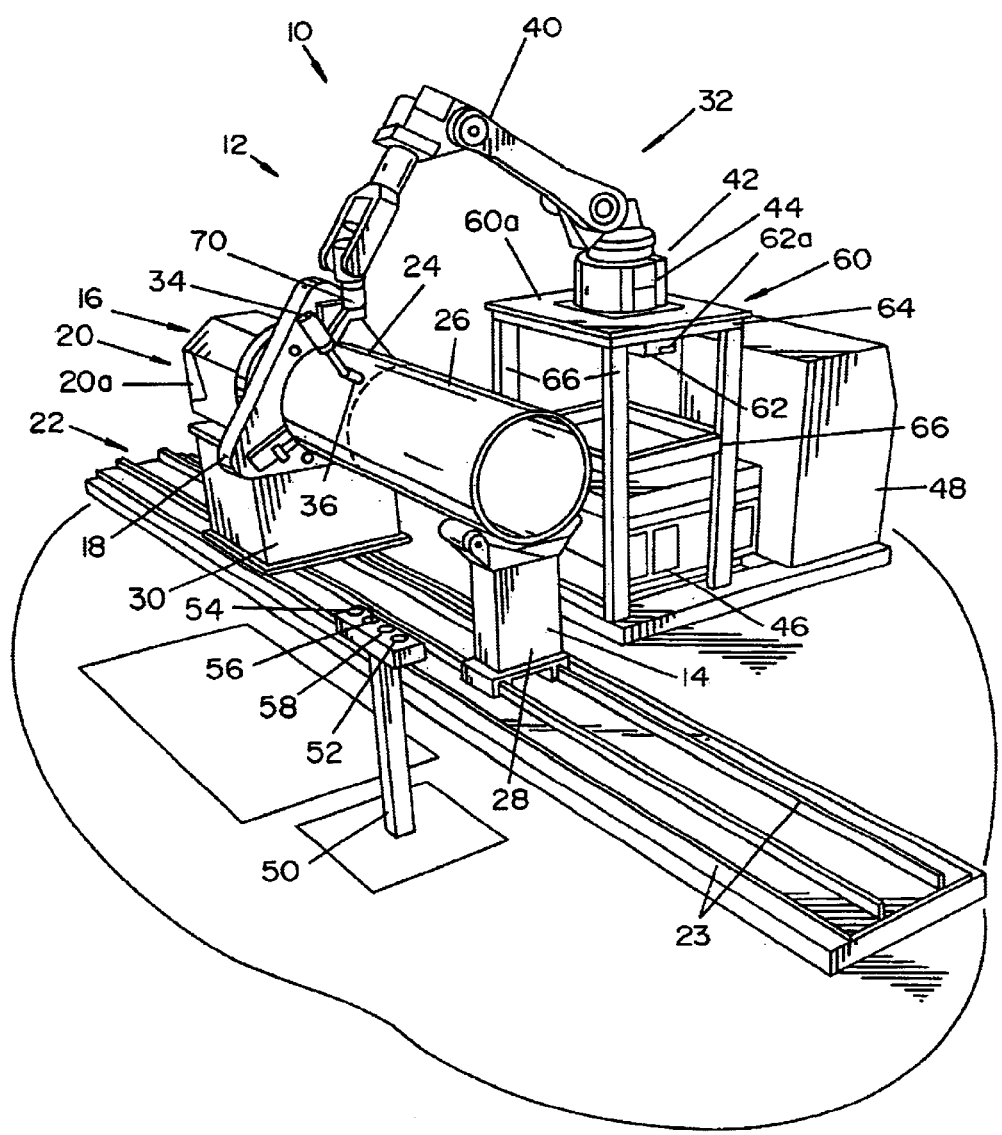
FIG. 1 is a perspective view for a robotic welding system in accordance with the concepts of the present application.
Figure 2:
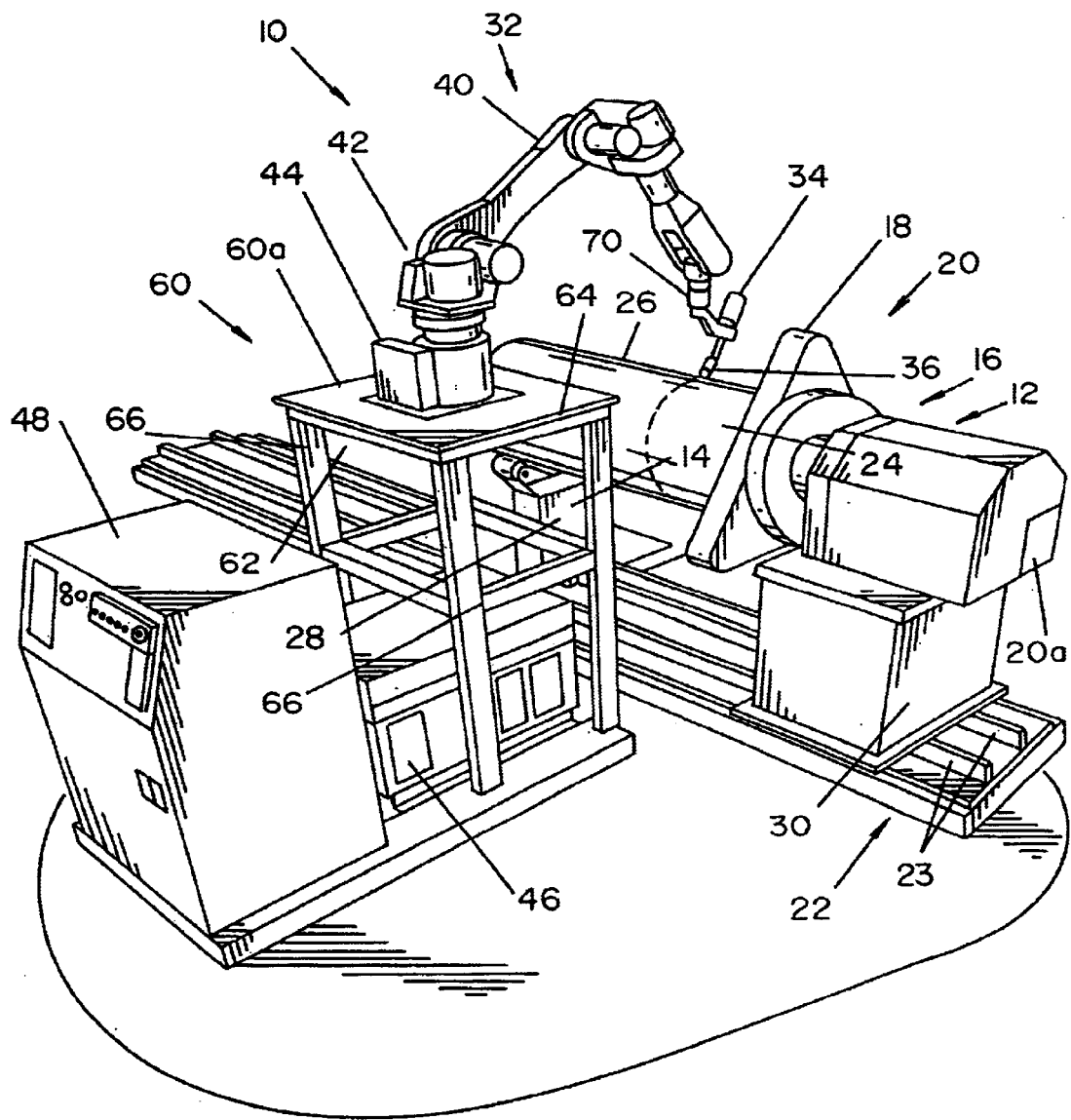
FIG. 2 is an alternative view of the robotic welding system of FIG. 1.

Referring now to the drawings wherein the drawings are for the purpose of illustrating the preferred embodiments of the invention only, and not for the purpose of limiting same, FIGS. 1 and 2 illustrate a robotic welding system 10 including a workpiece support assembly 12, having an idle arm 14 and head stock 16. Included as part of head stock 16 is a clamp or chuck element 18, and a motor/gear arrangement 20 having a motor controller 20a. The motor of motor/gear arrangement 20 may, in one embodiment, be a servo motor. Idle arm 14 and head stock 16 include wheels, bearings or other mechanisms to interface to a rail system 22, and which permit workpiece support 12 to move along rails 23. Idle arm 14 and head stock 16 each hold at least an end or portion of cylindrical workpiece portions 24 and 26, which are to be welded.

Idle arm 14 and head stock 16 are further configured with pedestals 28, 30, providing a known distance between the ground and workpiece portions held by workpiece support 12. Motor/gear arrangement 20 rotates the clamp element 18, which in turn causes workpiece portions 24, 26 to rotate at a predetermined speed. Workpiece portion 26 rotates with workpiece 24, since in pre-welding preparation steps, the cylindrical workpiece portions have been either tacked together by a pipefitter or an internal clamp (not shown) has been used to hold the workpiece portions in a fixed relationship. For example, if the workpiece portions are pipes, and the weld is an open root weld, the ends of the portions will be brought into an abutting relationship, followed normally by a withdrawal of a selected amount to define a minimum open root in the joint. To maintain the proper alignment and distance, and to allow for the rotation which will be used in embodiments of the present application, the two workpiece portions 24 and 26 are connected via the mentioned tacking procedure or through the use of an internal clamp, which are concepts well known in the art.

Arrangement of workpiece support 12 on rails 23, permit the workpiece to be manually or automatically moved to a predetermined position for the welding operation. For manual movement, an operator simply pushes the workpiece support 12 to a welding position. Automatic movement may be achieved by use of a motor arrangement (not shown).

The workpiece 24, 26 is positioned within the range of a robotic arm welding system 32 of robotic welding system 10. As illustrated in FIGS. 1 and 2, robotic arm welding system 32 includes a welding head assembly (also called herein a welder) 34 having a welding head or torch 36. Welder 34 is considered to include a welding cable which supplies gases, an electrode and/or a welding flux to welding head 36. Welder 34 is attached to robotic arm 40, designed to move welder 34 to and from the workpiece portions 24, 26. Robotic arm 40 is supported on base 42. A robotic arm motor and indexer unit 44 moves and controls the position of robotic arm 40. Power supply 46 supplies power to welding station 10. A robotic controller 48 controls operation of workpiece support 12, including operation of motor/gear arrangement 20, and the robot arm system 32. A control station (or system interface) 50 includes, among other elements, a data entry section 52, a start button 54, a manipulation refinement position control mechanism, such as a joystick 56 and a teach pendent 58 to manually position the robot arm. In one embodiment the data entry section 52 may include a programmable logic controller or other device which will accept data inputs, and the teach pendent can be used as a manual data entry input.

The mentioned components, including motor/gear arrangement 20, robotic arm motor/indexer 42, welding head assembly (or welder) 34 and robot controller 48, among other elements, are connected to each other via known wire connections (not shown, for convenience) and/or by a radio frequency (RF) design. Thus, for example, information input to data entry section 52 is transmitted to robotic controller 48, although it is shown a distance from interface 50. Power to the elements of robotic welding system 10 is supplied using well-known cabling arrangements.

In one embodiment, a movable table 60 is constructed to have its top portion 60a, which carries robot arm 40, move horizontally and/or vertically. Table motor/gear arrangement 62, including table motor controller 62a, is provided to move the tabletop section 60a in each of these directions. In this embodiment, tabletop 60a is carried on an intersecting rail system 64, wherein motor/gear arrangement 62 moves tabletop section 60a in x and y directions of a horizontal plane. Legs 66 are, in one embodiment, telescoping legs moved by motor/gear arrangement 62, permitting vertical movement of the tabletop 60a, as referenced to ground. Control of table 60 can, in one embodiment, be accomplished through the operation of joystick 56. Signals generated by movement of joystick 56 are transmitted to a table motor controller 62a of table motor/gear arrangement 62. Receipt of signals from joystick 56 initiates operation of table motor/gear arrangement 62, causing horizontal and/or vertical movement of tabletop 60a. Operation of teach pendent 58, which in one embodiment could be a joystick controller, permits an operator to manually move the robot arm 40 to a desired position. In one instance, manual control will be used to place the welder 34, carried by robot arm 40, to a start position prior to initiation of a welding operation. In an alternative embodiment, motor/gear arrangement is designed to make the tabletop 62a in x, y and z directions, thereby not requiring use of the telescoping legs.

It is to be appreciated that while FIGS. 1 and 2 illustrate a specific arrangement of the components, the robotic welding system may be configured using different arrangements which are equally applicable to the concepts of the present application. For example, system interface 50 is shown separate from robotic controller 48. However, in other embodiments the interface and robotic controller elements may be combined as a single unit. Also, whereas table 60 is described in one embodiment as being movable, in other embodiments table 60 may be stationary, and a motorized hinged manipulator connector 70 is used to hold welder 34. In this design, joystick 56 is used to control movement of hinged connector 70 to refine the position of welder 34. Still further, other system signals from joystick 56 may be used to move the entire welding platform, shown in FIGS. 1 and 2, when the platform is provided with appropriate motors and gears.

A further feature of the present application is the integration of motor/gear arrangement 20 into the welding system 10, which permits the system to be informed when cylindrical workpiece (24, 26) has been rotated 360°. By providing this integration, it is possible for welding system 10 to shut off the motor/gear arrangement 20 upon completion of a welding process or pass.

Figure 3A:
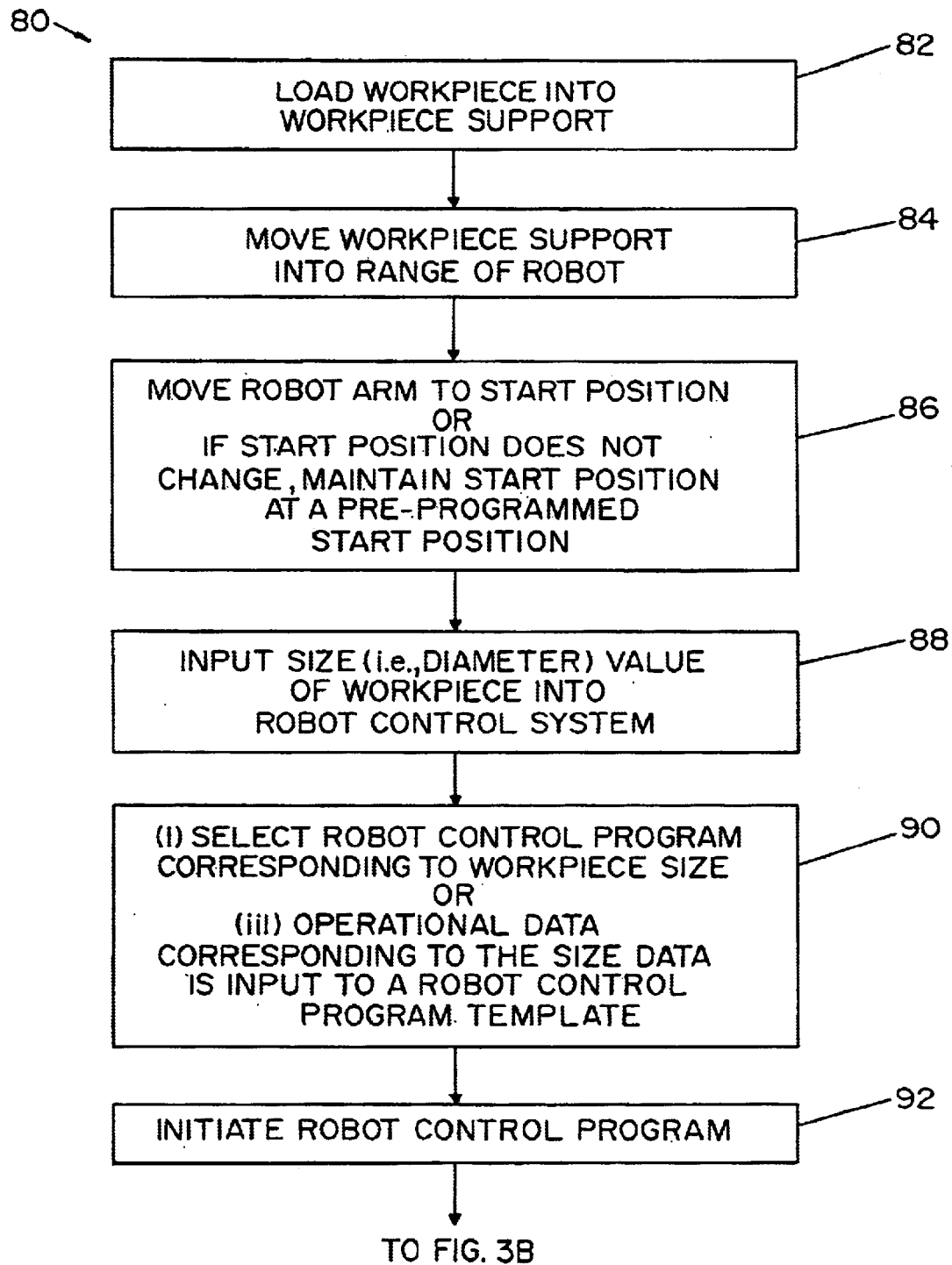
FIGS. 3a–3B show a flowchart for a process performed in accordance with the present application.
Figure 3B:
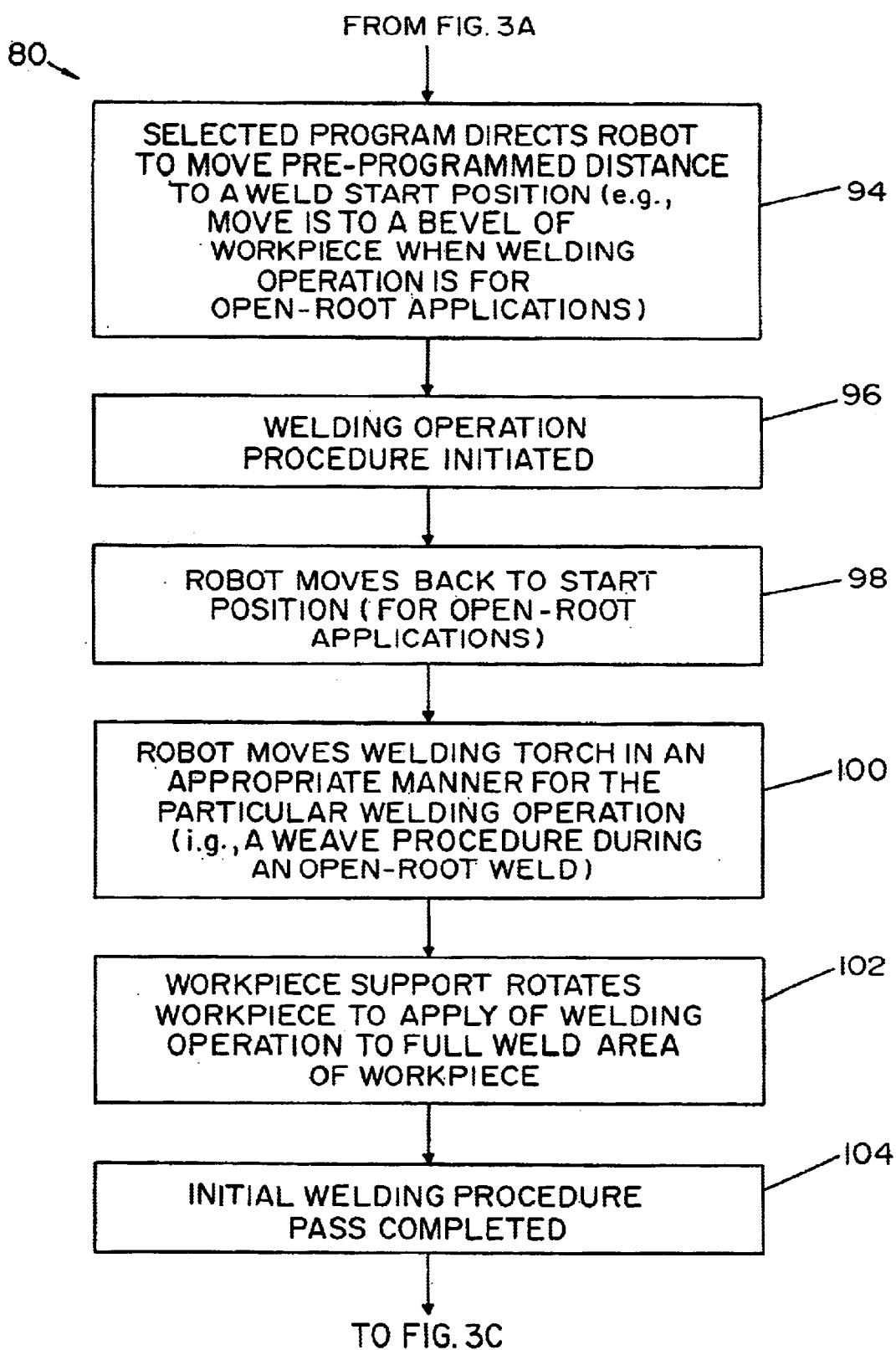
Figure 3C:
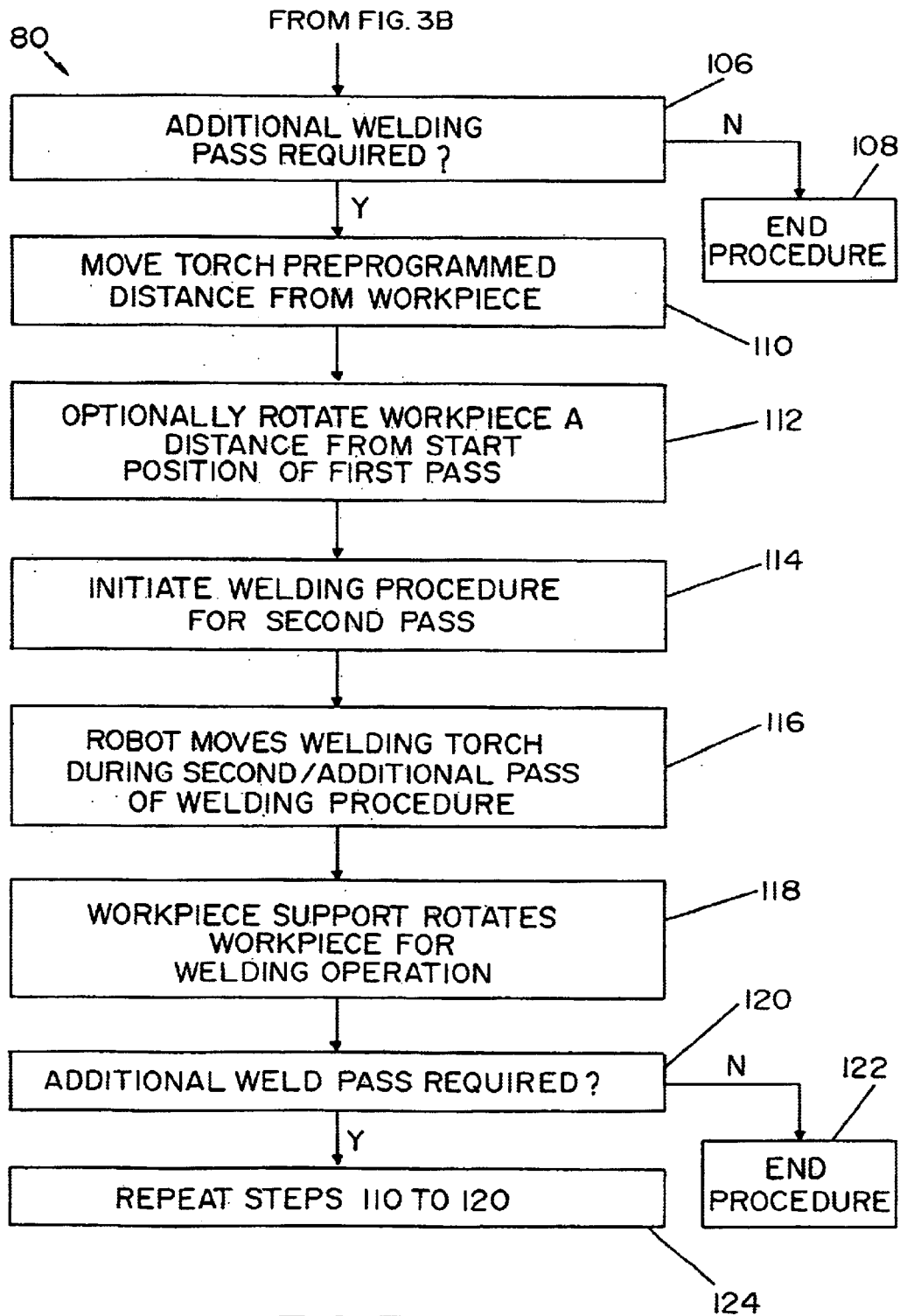

The operation of robotic welding system 10 will now be described with continuing reference to FIGS. 1 and 2, and additional reference to flowchart 80 of FIGS. 3A–3B. In a first step, a workpiece is loaded into the workpiece support 82. The workpiece may be manually and/or automatically loaded to the workpiece support. Preferably an operator, not shown, loads the cylindrical workpiece, such as tubes, pipes, tanks, cylinders, columns, or other cylindrical weldable material. The weldable material is perferably a type of metal. However, the described system may also be usable with other weldable material such as weldable plastics and ceramics. As previously mentioned, one end of workpiece portion 26 lies on the idle arm 14 and the other workpiece portion 24 is held in clamp 18. Once the workpiece has been securely attached, the workpiece support is moved, if necessary, to locate the area to be welded into a region accessible by the robot arm 84. The location may be a specific point, or somewhere within an envelope of the robot arm's range of operation. This movement can be manual, or the workpiece support may be provided with a motorized transport system as would be known to one of ordinary skill in the art.

Once the workpiece support is at an appropriate location, the robot arm is moved to a start position, or if the start position does not change, the previous position of the robot arm is maintained 86. Next, the operator inputs a size, i.e., diameter of the workpiece to a robotic controller 88. The inputting of the diameter of the workpiece will in one embodiment cause selection of a robot control program, from a family of robot control programs, corresponding to the workpiece diameter. In another embodiment, operational data corresponding to the input diameter size is input into a robot control program template 90. Next, the selected robot control program or the template control program is initiated to control operation of the robot arm and motor/gear arrangement 92. The robot control program directs the robot arm to move a preprogrammed distance to a weld start position 94. For example, when the welding operation is designed to weld a pipe joint having an open-root joint, the move is in a horizontal position to a bevel of a workpiece portion to be welded. In many operations, the welder is preferably positioned at a location of the workpiece between 10 and 2 o'clock. Once in proper position, the program initiates the welding operation (e.g., an arc weld is struck) 96. When the operation is for an open root weld, the robot will move back to its initial start position 98. Thereafter, the robot is controlled to move the welder in an appropriate manner for the intended welding application 100. For example, when an open-root welding process is undertaken, the robot arm will move the welding torch in a weaving pattern as is well-known in the art.

During the welding operation, the motor/gear arrangement operates to rotate the cylindrical workpiece to perform a welding operation in a welding time which has a correspondence to the diameter of the workpiece 102. The welding operation continues until an initial welding pass has been completed 104, where the initial welding pass welds the full 360° of the cylindrical workpiece. Next, a determination is made by the control program as to whether an additional welding pass is required 106. When it is determined such an additional welding pass is not required, the procedure ends 108. However, if it is determined an additional welding pass is required, the welder is moved a preselected distance from its welding position 110. The preprogrammed distance is sufficient so the welder is moved from the just-deposited weld material a distance sufficient to permit a second welding pass. Particularly, during the first welding pass, the depositing of the weld material decreases the depth of the weld area. Therefore, the welder is pulled back a sufficient distance so a proper arc may be formed.

Next, and optionally, the workpiece is rotated, via operation of the workpiece support, a predetermined number of degrees from the start position of the first pass 112. This step insures that the start and end welds of additional passes are not layered on top of each other. In one embodiment, for example, the workpiece is rotated 180° from the original start position such that the second start position will be 180° distanced from the first start weld position. Once the workpiece is rotated, the next welding pass procedure is initiated 114. The second pass may be a different welding process than that of the first welding process. For example, if the first welding pass undertakes a surface tension transfer process (STT, a trademark of Lincoln Electric Corporation), the control program may institute different welding processes (e.g., conventional CV welding, pulse welding, pulse-on-pulse welding, etc.) for the next or additional passes. Upon initiation, the robot arm moves the welding torch in a path appropriate for the second or further welding procedure 116. At the same time, the integrated motor rotates the workpiece during this subsequent welding pass 118. As previously mentioned, the rotation of the workpiece will normally be 360° to provide the full weld area of the workpiece to the welding operation. Following the second pass, an inquiry is made whether an additional welding pass is required 120. When it is determined no additional welding is required, the process ends 122. However, if additional welding passes are necessary, steps 110–124 are repeated.

The order of the steps described in connection with flowchart 80 of FIGS. 3A–3B may be processed in an order other than as presented therein. For example, where movement of the robot arm to a start position (step 86) is recited prior to the input of the size (e.g., diameter) of the workpiece to the control program (step 88), in other embodiments, the inputting step (88) may occur prior to the positioning of the robot arm (86). It is to be understood the foregoing is presented as an example, and the order of other steps may also be altered. Further, a number of the steps of FIGS. 3A–3B are optional and/or directed to a particular welding process, such as an open-root application. It is to be appreciated flowchart 80 is considered to be applicable to alternative welding procedures other than open root welding.

Figure 4A:
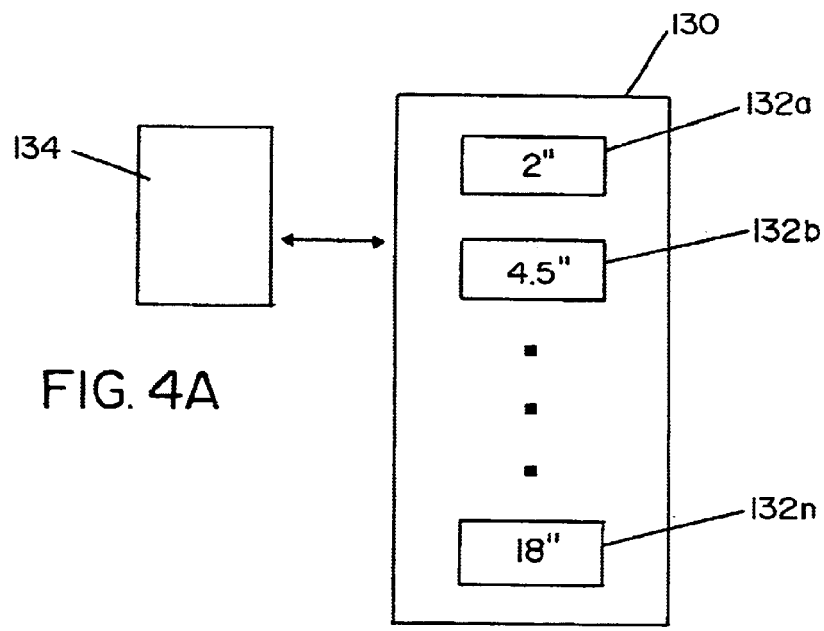
FIG. 4A depicts interaction between an input request for a control program stored in a robotic controller.

With more particular attention to step 90, in one embodiment, and as shown in FIG. 4A, robotic controller 48 includes a storage area 130 which stores a family of control programs 132a, 132b, 132n. Each control program 132a–132n, includes steps for welding cylindrical workpieces. For example, program 132a may be for welding pipes two inches in diameter, program 132b for welding 4.5-inch diameter pipes, and program 132n for welding 18-inch diameter pipes. The recited diameters are presented only as examples and, programs for different types and sizes of cylindrical workpieces may also be stored in storage area 130.

Each of the programs of the family of programs 132a–132n employ the same welding processes and/or procedures. More particularly, the programming logic and instructions are substantially identical. The similarity of the programming logic within a family of programs is taken advantage of to decrease the programming burden and increase the ease by which the programs of a family of programs are replicated.

In generating a family, initially one control program for a cylindrical workpiece of a certain diameter is created. Thereafter, the programming logic is copied for the number of control programs in the family of programs. Once the additional family members are copied, only minor changes are made to enable the family members to be used with different sized cylindrical workpieces. The basic change to the programs is the time taken to rotate the workpiece, i.e., the speed at which the workpiece is rotated. Thus, the present application takes advantage of the inventor's investigation into the similarity of cylindrical objects of a same class (e.g., class=metal pipes, class=metal tanks, class= plastic tubes, etc.) irrespective of diameter sizes, and the corresponding similarity of welding steps employed to weld such cylindrical objects irrespective of their diameters. Due to fundamentally similar geometric shape of a class of cylindrical workpieces, a family of control programs will employ the same welding steps, which differ only in the time taken to rotate the workpiece.

With attention to the time necessary to rotate the cylindrical object 360°, it has been observed that the larger the cylindrical workpiece diameter (for a class such as pipes), the thicker the cylindrical workpiece material. Therefore, more weld material needs to be applied to the weld area. As a consequence, for high quality welding, the larger the cylindrical workpiece, the slower the speed of rotation in order to provide the thicker layers of weld material into the weld area. The welding time for a specific diameter is simply inserted into the replicated programs of the first generated program. The inserted welding time replaces the welding time existing in the original program. It is to be understood that the speed at which a workpiece is rotated may be consistent throughout the welding operation, or alternatively, may vary depending upon the instructions of the control program.

In a preferred embodiment, the robot arm is moved to a start position by manual operation of the teach pendent 58. However, in an optional embodiment, unique start positions which are dependent on the diameter of the workpieces being welded, are directly incorporated into the individual programs of the family of programs in a manner similar to the welding time.

By appreciating the similarity between cylindrical objects of a class, irrespective of diameter, the different sized diameter workpieces will employ substantially identical welding procedures and/or processes. This understanding permits for the implementation of a family of easily reproducible computer programs which employ the same incremental moves to control the welding operation irrespective of diameter size. The parameters which vary between the different sized workpieces, are a very small percentage of the overall robotic control program. Therefore, any two programs of a family of programs will be at least 90 percent identical in content, and more preferably over 95 percent identical in content, wherein content is the programming logic of the programs, as embodied in the coding of the control programs. Thus, most preferably the instructions among the programs are 100% identical and only variables (e.g., rotation speed) are different.

Maintaining attention to FIG. 4A, by the design described above, when an input request 134 is received via interface 50 of FIGS. 1 and 2, and the operator inputs a specific pipe size (e.g., 4.5 inches) the program corresponding to that diameter is selected and downloaded for operation by robotic controller 48.

Figure 4B:
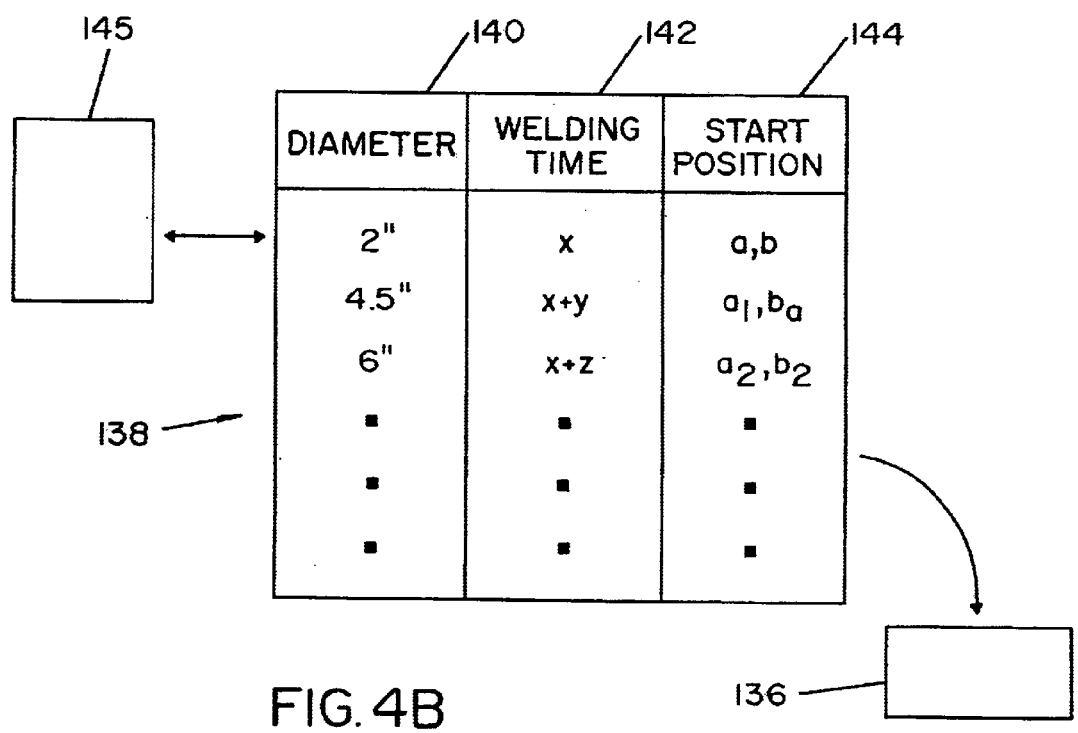
FIG. 4B depicts an input request to a look-up table for incorporation of values into a template control program.

In an alternative embodiment as shown in FIG. 4B, instead of the family of programs 132a–132n of FIG. 4A—and again using the knowledge of similarity between cylindrical workpieces of varying sizes—a program template 136 is designed and used in place of the family of programs 132a–132n. Template program 136 provides the incremental moves required by robotic welding system 10 to weld workpiece portions 24, 26. In one embodiment, a lookup table 138 includes a Diameter reference column 140 linked to a Welding Time column 142 and, optionally, a Start Position column 144. An operator input command 145 requesting a particular diameter (e.g., for 8-inch pipe), is directed to the lookup table 138, where the corresponding variable information is selected and inserted to template program 136.

Figure 5:
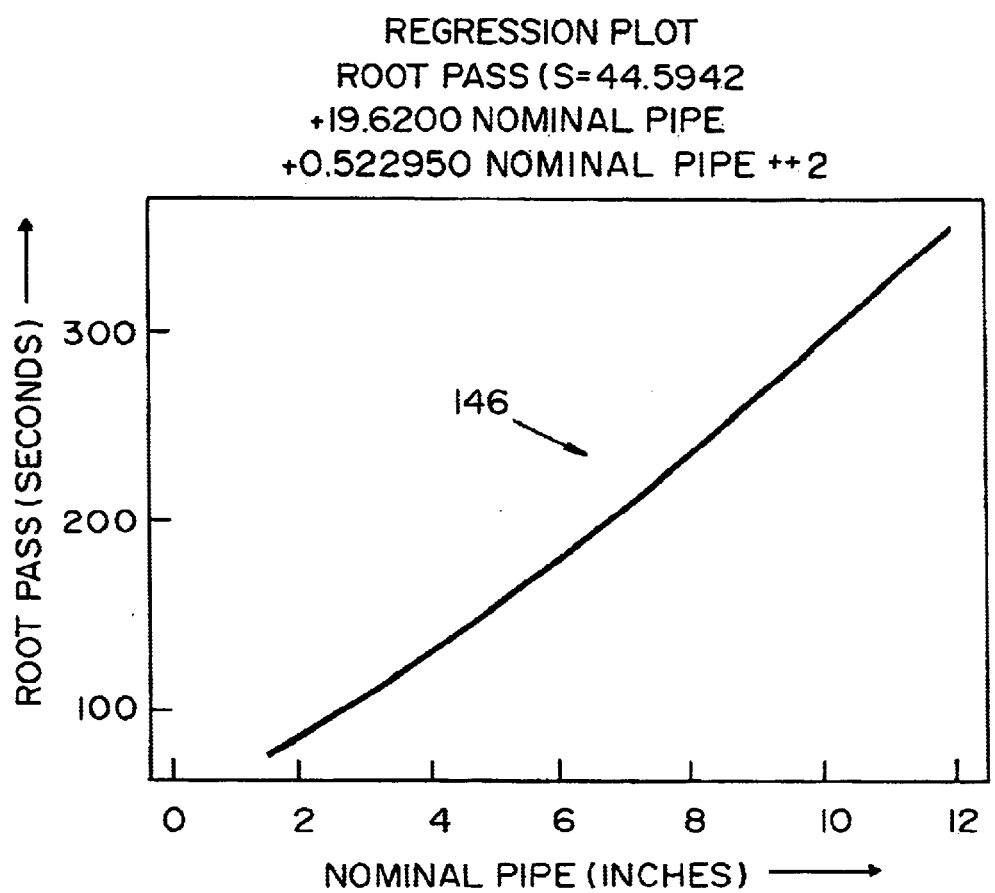
FIG. 5 is a regression chart for a first root pass welding time to a variety of pipe diameters.
Figure 6:
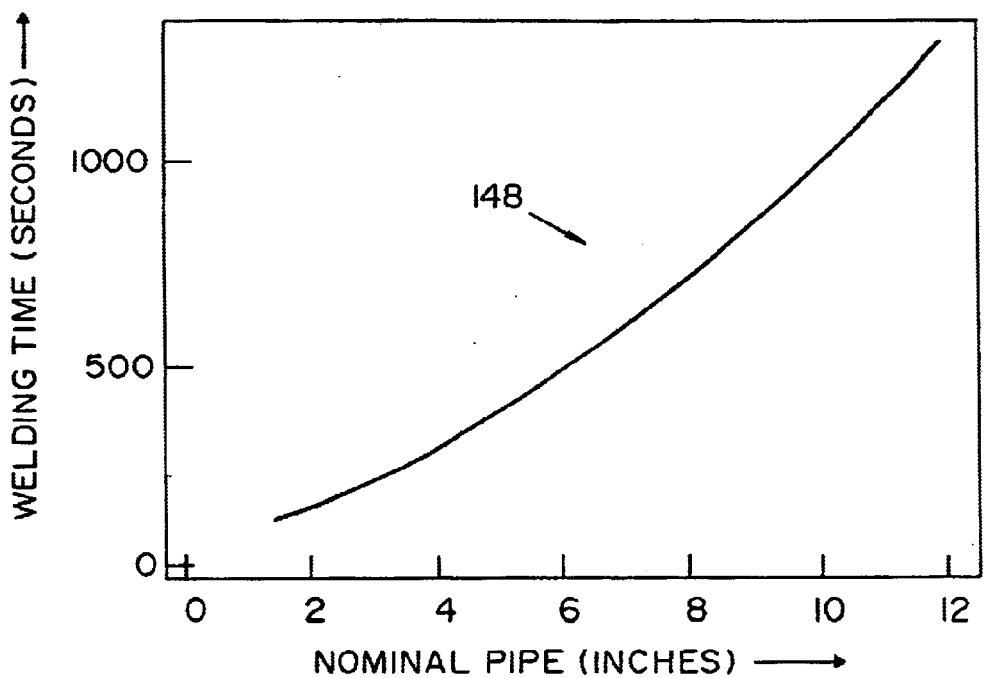
FIG. 6 is a regression chart for a total welding time for a variety of pipe diameters.

With continuing attention to the speed at which the workpiece is to be welded, the inventor performed extensive research and experimentations. This investigation included welding pipes of a certain size at certain rates of rotation. For example, a 2-inch pipe diameter was welded in accordance with a welding procedure of a first welding time. Following the welding procedure, that welded pipe was reviewed for a variety of quality control features, including but not limited to completeness of the weld and weld strength. Additional 2-inch pipes were welded using the same welding procedure but at different welding times. The welded pieces were then also quality control tested, and the pipe having the highest quality weld was selected. The rotation welding time for this pipe was then plotted as a point on a chart of pipe sizes versus welding time. Next, pipes of other sizes (e.g., 4-inch and 6-inch pipes, etc.) were then welded. The welding procedures for each of the different sized pipes being the same. Following the welding and testing of the different sized pipes, a best welded pipe for each size was selected. Thereafter, the welding time for each best weld was also plotted to obtain a variety of test points. Using the plotted points, welding times for non-tested pipes of different sizes were obtained through known extrapolation and/or regression plotting mathematics and techniques. In one instance, and as shown in FIGS. 5 and 6, plots representing the welding time versus the size (diameter) of a cylindrical workpiece, may be obtained by use of statistical software for line plotting, such as Excel or Minitab software.

As previously noted, in one embodiment, the first pass of the welding process may be an open root welding operation. FIG. 5 illustrates a regression plot 146 for a root pass, with seconds versus the size of the nominal pipe. This regression plot is for a welding process to weld a V-joint, which is commonly used for the joining of two pipes. As illustrated, regression plot 146 is substantially linear where, as the pipe size increases, the rotation speed of the workpiece decreases.

As previously noted, in many instances more than a single weld pass is required to complete the weld operation. FIG. 6 depicts a regression plot 148 for a V-joint welding process for total welding time versus a nominal pipe size. As can be seen in this plot, the total time necessary (i.e., the initial open root plot and a second pass) increases at a greater rate as the pipe size increases.

Using the research and experimentation undertaken by the inventor, a generalized welding time formula has been obtained for the first pass open-root weld of a V-joint welding operation. The time in seconds for the root pass may be found by:

$$\text{FirstPass}_{seconds}=a+(b\times\text{nominal diameter})+(c\times\text{nominal diameter})^2,$$

where a is in a range from 10 to 50 seconds, and preferably 44.5942 seconds, b is in a range from 10 to 25 seconds, and preferably 19.6200 seconds, c is in a range of 0.10 to 0.75 seconds, and preferably 0.522950 seconds, and nominal diameter is the stated workpiece diameter.

Similarly, the inventor has determined a generalized formula for a V-joint welding process for a total welding time in seconds, which may be found by:

$$\text{TotalTime}_{seconds}=x+(y\times\text{nominal diameter})+(z\times\text{nominal diameter})^2,$$

where x is in a range from 10 to 70 seconds, and preferably 67.3598 seconds, y is in a range from 10 to 40 seconds, and preferably 33.8308 seconds, and z is in a range of 0.10 to 10 seconds, and preferably 5.67906 seconds, and nominal diameter is the stated workpiece diameter.

The foregoing formulas used to obtain the welding time in accordance with concepts of the present application are appropriate for V-joint welding. However, it is to be appreciated that dependent upon a particular welding process employed by a user, the range and specific statements of time described herein may be inappropriate. Provision of this formula, and the specific times set out herein are not intended to be warranties of any type that a weld made in accordance with these formulas will meet any existing welding standards, or be appropriate for any specific welding application. Further, in one embodiment the stated nominal diameter is the diameter provided by a manufacturer, or supplier. However, in other embodiments the stated diameter may be an actual measured diameter. Also, while a diameter measurement is used in this embodiment, the formulas may be adjusted for use with the measurements of a cylinder, such as a circumference.

With continuing attention to the control programs, it is known that in some uses, the welding material used may result in metallurgical changes in workpieces. In such situations, it is a requirement that the welding temperature decreases prior to a second welding pass. If the temperature is not permitted to decrease prior to a second welding pass, a defective weld may occur. Therefore, when the welding process is used in these situations, either the family of control programs or the template control program will include a time delay which permits an interpass temperature to decrease to an acceptable level. Instructions for this time delay would be undertaken during the coding of the first of program of the family of programs, and would then be transferred to the other family members during the replication operation.

Further, the control programs as designed, especially in the family of programs, are portable in one instance, since the family of programs are created from a single base member of the family. The single base program may be easily transmitted electronically to remote sites via an e-mail transmission or other well-known electronic communication connection. Thereafter, the receiving party is able to easily construct the program family using the replication techniques previously discussed.

Figure 7:
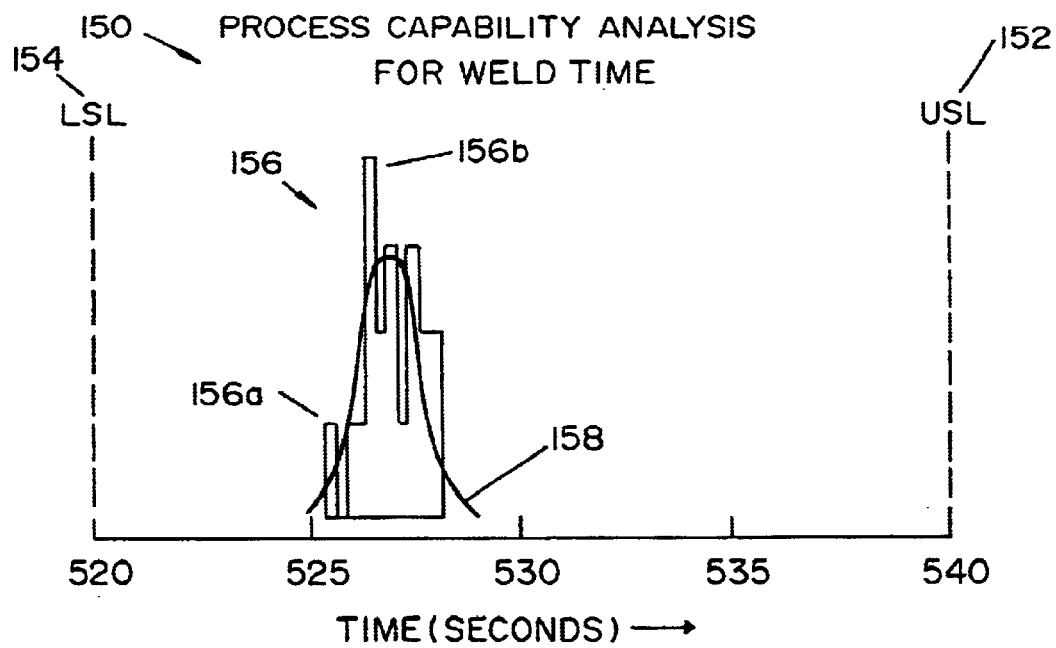
FIG. 7 shows a process capability analysis for weld times using a robotic welding system according to the present application.

Implementation of the robotic cylindrical welding processes of the present application results in an improved process capability with an increased welding performance than has previously been achieved. FIG. 7 is a chart of a process capability analysis for weld times 150. The chart defines an upper specification limit 152, and lower specification limit 154 defining an acceptable pipe welding time range. Bar graphs 156 represent a histogram of an amount of 8-inch diameter pipes welded within a certain welding time range (e.g., approximately 525 seconds to 528 seconds per weld). As can be seen here, the welding of the pipes shown by bar graphs 156 are all within the acceptable range as emphasized overall averaged curve 158.

Figure 8:
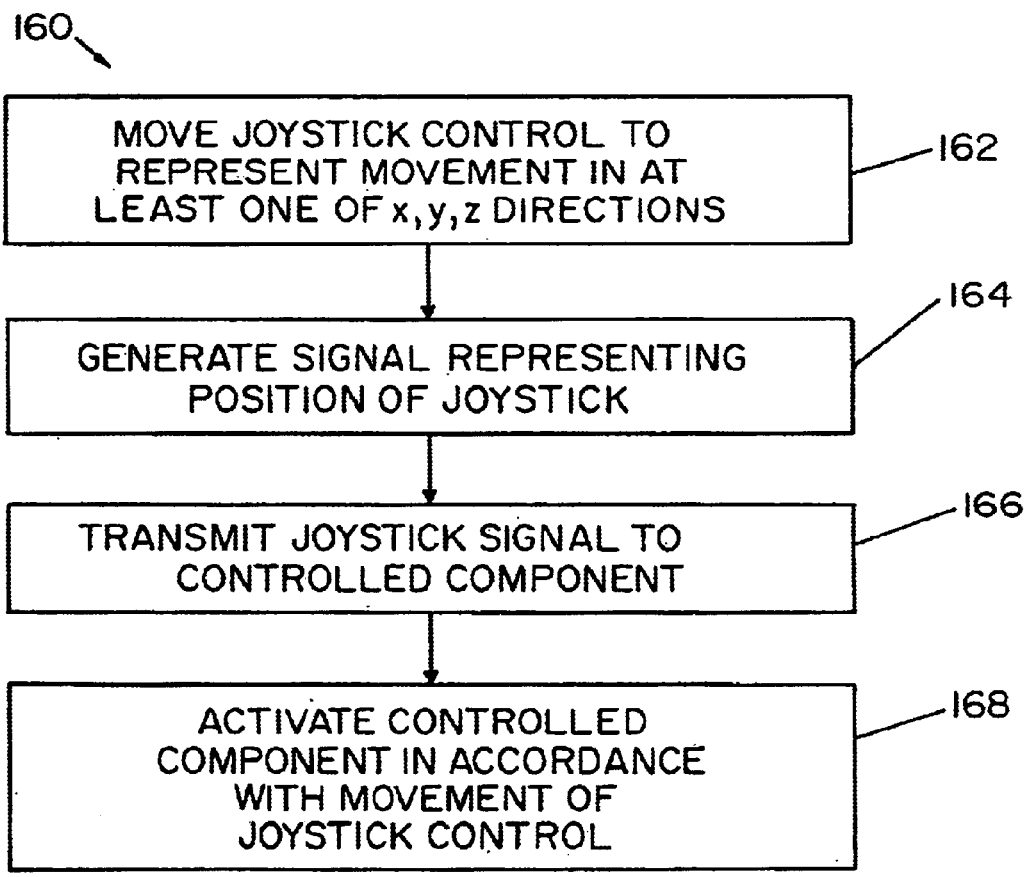
FIG. 8 is a flowchart for manipulator control in accordance with the present application.

Turning to FIG. 8, and with continuing attention to FIGS. 1 and 2, operation of joystick 56 will now be discussed in greater detail. Operational joystick flowchart 160, includes movement of the joystick which represents movement in at least one of a horizontal or vertical direction 162. Movement of the joystick generates a joystick position signal 164, which is transmitted to a controlled component 166 (such as a movable table 60 of FIG. 1). Reception of the joystick signal activates the controlled component in accordance with movement of the joystick 168. Therefore, and with continuing reference to FIGS. 1 and 2, when joystick 56 is moved in a selected direction (and when the first embodiment is used with movable table 60), the location of robotic arm 40 is altered from the location prescribed by the robotic control program. This refinement control is useful, as it is known that while smaller cylindrical workpieces have a very high degree of accuracy in their diameters and their geometric shape, as the diameters of cylindrical workpieces increase, manufacturing imperfections become apparent. These imperfections result in a less than ideal cylindrical workpiece having non-cylindrical features. The present application provides a welding system with an open-loop type robotic control program. Therefore, the control programs are not provided with feedback signals to address these imperfections. Rather, an operator can directly address the imperfections by use of the joystick 56. The operator is able to alter the position of the robotic arm 40, with reference to the workpiece when it is determined the shape of the pipe does not correspond to the expected cylindrical workpiece for which the robotic arm has been programmed. Use of joystick control provides a manual assist to the robotic control program without requiring the high infrastructure costs of a closed-loop feedback system. This feature also permits the operator to provide adjustments to the location of the welder to address imperfect cylindrically formed workpieces, without interrupting operation of the robotic control program.

Figure 9:
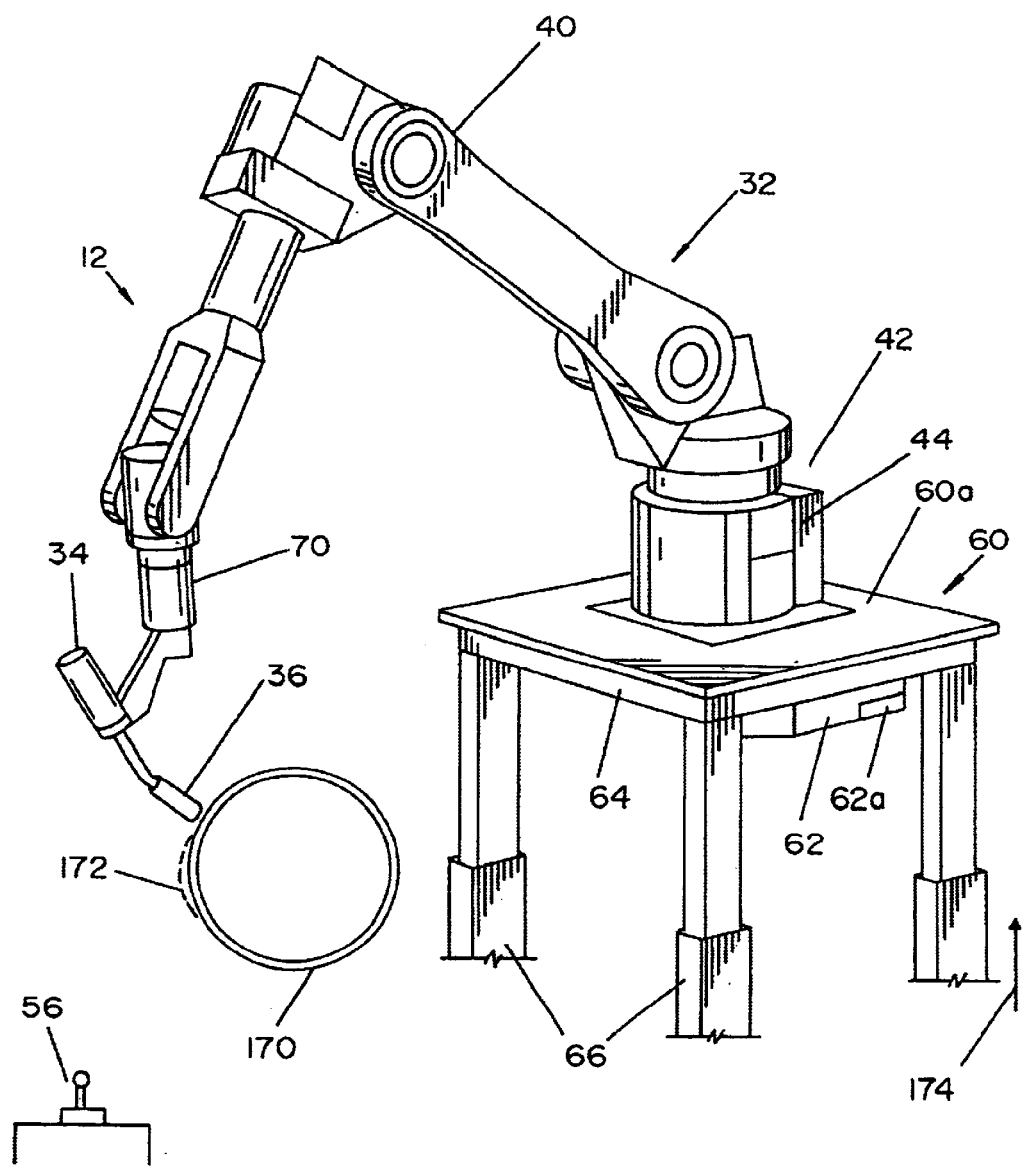
FIG. 9 illustrates operation of a refinement control in accordance with the manipulator operation of FIG. 8.

FIG. 9 illustrates the concepts of the refinement control provided by the joystick control system 56. Illustrated in side view is robotic arm 40, with movable table 60, including telescoping legs 66. In this embodiment, the cylindrical workpiece 170 shown in a solid line is a substantially true cylindrical geometric shape. In this instance, welder 34 is directed to the proper welding position with regard to cylindrical workpiece 170. However, imperfections 172 in the cylindrical shape may occur, especially in cylindrical workpieces of larger dimensions (e.g., 12 inches and above). In this example, imperfection 172 would result in the welder 34 being too far into the welding area. An operator will visually note this imperfection and as the rotation of cylindrical workpiece 170 is occurring, the operator uses joystick 56 to adjust or refine the welding process by moving the entire robotic arm via operation of the joystick 56. The operator moves joystick 56 to activate telescoping legs 66 increasing the height of tabletop 60a (in the direction shown by arrow 174), raising the entire welding arm to a location for welding of imperfection 172. As the cylindrical workpiece 170 continues its rotational path, and imperfection 172 is passed, the operator moves joystick 56 to reposition the telescoping legs 66 to their original position. In alternative uses, joystick 56 is used to move tabletop 60a horizontally to address other imperfections in the cylindrical workpiece.

Figure 10:
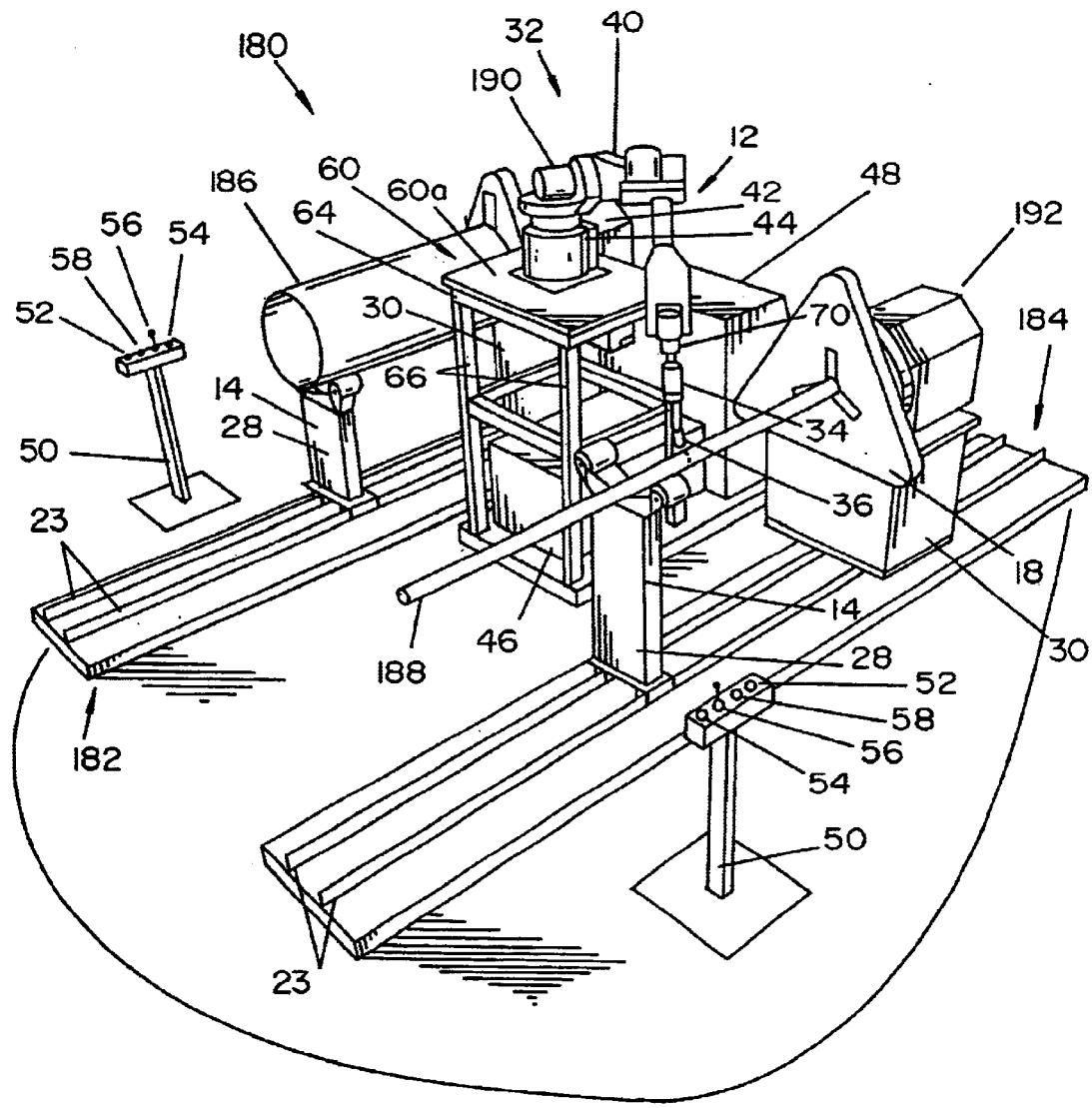
FIG. 10 presents a robotic system employing a dual workpiece support configuration.

Turning to FIG. 10, depicted is a welding system 180 incorporating dual workpiece supports 182, 184 similar to those previously described. This design permits the robotic arm to improve the efficiency of its work processes by removing idle time once workpiece of one workpiece support has been welded and then must be removed prior to a next welding operation. By use of dual workpiece supports 182, 184. Once welding of a workpiece 186 carried on workpiece support 182 is completed, the robotic arm moves to welding of another workpiece 188 held in workpiece support 184. This figure also illustrates the present concept may flexibly weld cylindrical workpieces (e.g., workpieces 186 and 188) of different diameters.

With continuing reference to FIG. 10, in one embodiment robotic arm 40 has six axes of movement, including movement in the x,y,z direction and for yaw, roll and pitch movements. Robots of this type are known to exist. However, a feature of the described system provides a seventh axis of movement through the integration of the motor/gear arrangement 190 as part of robotic system 180 and controlled by robot controller 48. Thus, workpiece support 182, provides a seventh axis of movement. Additionally, an eighth axis of movement is provided by the dual workpiece support system by integration of workpiece support 184, which has a separate motor/gear arrangement 192 also integrated into the robotic system and controlled by robotic controller 48.

Figure 11:
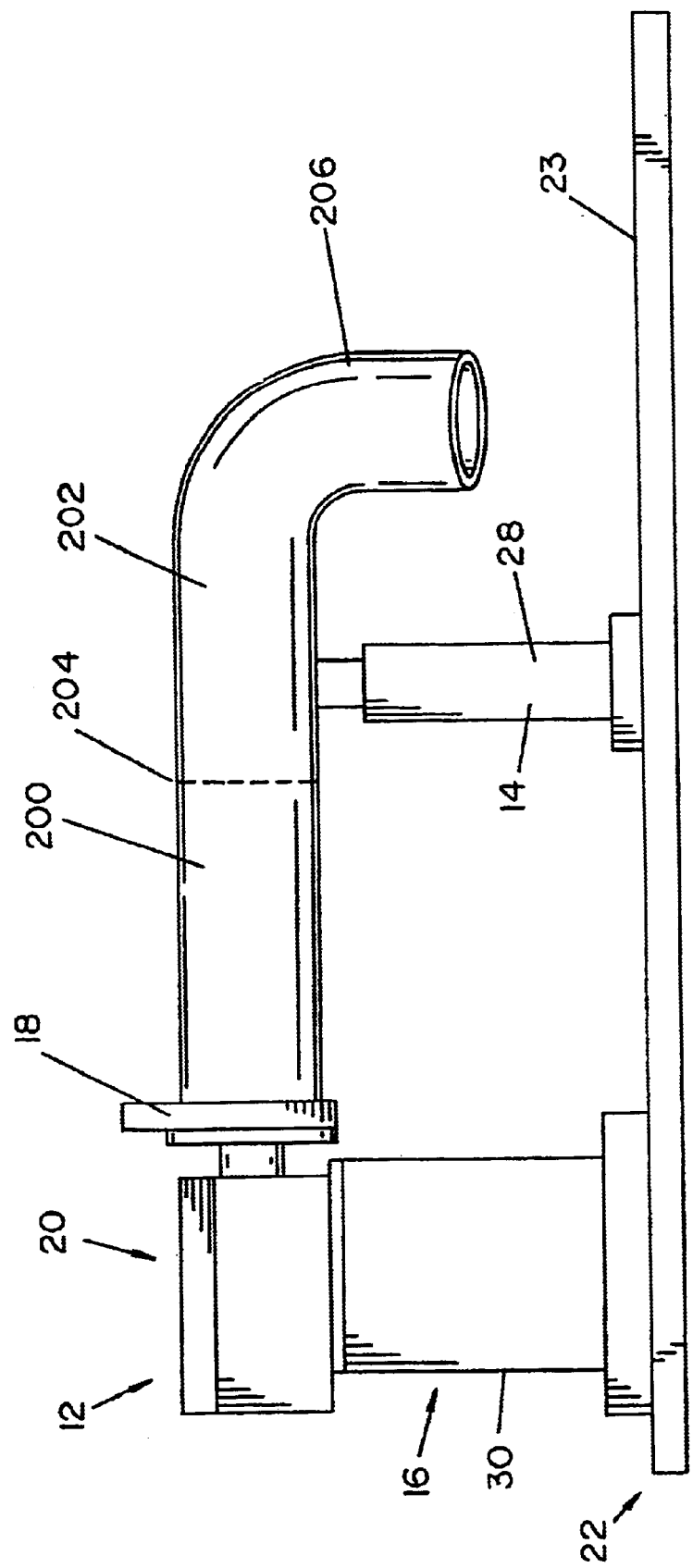
FIG. 11 illustrates a workpiece having a first workpiece portion and a second workpiece portion where at least a section of the second workpiece portion is in a plane other than the first workpiece portion.

With continuing attention to FIGS. 1, 2 and 10, the workpiece supports have been constructed to incorporate pedestals (e.g., 28 and 30 of FIG. 1) such that the cylindrical workpieces are a predescribed distance above the ground. By this design it is possible to weld workpiece portions which are not entirely within the same horizontal plane. For example, in FIG. 11, all of workpiece portion 200 is substantially entirely in the same horizontal plane. Workpiece portion 202 (which may be understood to be an elbow portion) is only partly within the same horizontal plane as workpiece portion 200. Where the two portions come together in welding area 204, the portions are in the same plane to permit an alignment of the surface edges. However, the form of workpiece portion 202 includes a section 206 in a separate plane. Without use of pedestals 28 and 30, when workpiece portions 200 and 202 are rotated, section 206 of workpiece portion 202 would come into contact with the ground, blocking further movement and resulting in an inability of the system to weld these workpiece portion combinations. Thus, by this design, irregular objects not entirely in each other's horizontal plane may be welded together. The heights of pedestals 28 and 30 are adjustable by known height adjustment mechanisms.

The movable workpiece supports also provide a capability of welding extended lengths of cylindrical workpieces. Particularly, in FIG. 1, by adding additional idle arms, such as idle arm 14, on the rail system 23, additional workpiece portions may be added. Then in operation, once a first weld is accomplished, the workpiece support is moved to a next area to be welded within the welding envelope. Thereafter, these portions may be welded and the process repeated. By this design, lengths up to fifty feet or more may be welded, providing an appropriate number of the idle arms are used, and a motor with sufficient power to turn the various workpiece portions are used.

Cylindrical workpieces as small as one inch in diameter have been welded using this process, and the upper diameter limit would appear to only be limited by the physical size of the system.

An additional benefit of the present application is that there is not a requirement of a pipe edge (land) to weld the workpiece portions. This is particularly possible when the welding process employed is the surface tension transfer process, which allows a very fine control of heat input. Further, the use of a variable power control supply is used in this system for the changing from a first welding process to a second or subsequent welding process on-the-fly. One particular power source which permits this switching capability is an STT/Powerwave 455 from Lincoln Electric Corporation.

As described, the robotic welding system incorporates a family of control programs (or a template control program), these programs may be considered to provide open-loop control. Use of a manipulator such as joystick 56 permits an operator to adjust the path of welding based on a visual observation. Thus, operator intervention is able to adjust the open-loop control of the control program(s). This refinement control is especially beneficial in connection with welding of large cylindrical diameter workpieces which may not be ideally round. A combination of the open-loop control program with the refined control available through the use of the manipulator joystick, permits the present application to provide on-the-fly procedure adjustment and on-the-fly process adjustment. On-the-fly process adjustment is incorporated during the coding of the control programs, wherein during a first pass a first welding process is performed, (e.g., conventional CV, STT, etc.), and then during a second pass operation transitions to another welding process (e.g., pulse welding, pulse-on-pulse welding, etc.). The on-the-fly procedure adjustment is obtained through the use of the manipulator joystick, where based on visual inspection, an operator provides refined positioning above what is achievable by the control program.

Through use of the present system, including the ability to select a variety of workflow programs for cylindrical welding, it becomes economical to use a robotic welding system to weld single pieces rather than requiring large runs of the same-sized pieces.

The invention has been described with reference to a preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

What is claimed is:

1. A method of welding a cylindrical workpiece by use of a robotic welding system, the method comprising:
   loading a substantially cylindrical workpiece into a workpiece support;
   positioning a robot arm, carrying a welder, to a start position;
   inputting by an operator a value representing a size of the cylindrical workpiece, to a robot controller via a robotic interface;
   obtaining a control program, corresponding to the value input to the robotic interface;
   initiating operation of the control program;
   moving the robot arm a preprogrammed distance towards a work surface of the workpiece, based on instructions from the control program;
   undertaking a welding procedure in accordance with instructions from the control program including, initiating operation of the welder;
   moving the welder in a pattern appropriate for the welding process being undertaken in accordance with the control program; and
   moving at least one of the workpiece and welder relative to each other so as to perform the welding operation as determined by the control program.

2. The method according to claim 1, wherein the control program is one of a plurality of control programs are a family of control programs stored in the robotic controller, and wherein the plurality of control programs correspond to different sizes of workpieces.

3. The method according to claim 2, wherein control programs of the family of control programs are at least ninety percent identical to other control programs of the family of control programs.

4. The method according to claim 2, wherein the control programs corresponding to different sizes of workpieces include instructions to perform the welding operation within different welding times dependent upon the size of the workpiece.

5. The method according to claim 4, wherein the welding time will determine speed at which the workpiece is rotated by the workpiece support.

6. The method according to claim 1, including positioning the workpiece support a distance from the ground, wherein a first cylindrical workpiece portion is welded to a second cylindrical workpiece portion, the second cylindrical workpiece portion having a section in a different horizontal plane than the first cylindrical workpiece portion.

7. The method according to claim 6, wherein the head stock includes a motor for rotating the workpiece, integrated with the robotic controller, wherein the operation of the motor is controlled by the control program.

8. The method according to claim 1, wherein the control program is a single control program stored in the robot controller, wherein inputting of a size value of workpiece causes the control program to be loaded with specific time or position values to replace variables within the control program, such replacement customizing the control program for the selected size value.

9. The method according to claim 1, further including manipulating the location of the welding torch via a manipulation control mechanism while the welding operation, controlled by the control program, is being performed.

10. The method according to claim 1, further including manipulating the location of the robotic arm via a manipulation control mechanism while the welding procedure, controlled by the control program, is being performed.

11. The method according to claim 1, wherein the control program is designed to perform at least a first welding pass.

12. The method according to claim 11, wherein the first welding pass employs a first welding process and a second welding pass employs a second welding process, different from the first welding process.

13. The method according to claim 12, wherein the moving from the first welding procedure to the second welding process occurs automatically without operator action.

14. The method according to claim 12, wherein the first pass performs a surface tension transfer welding process.

15. The method according to claim 11, wherein the first pass performs an open-root weld.

16. The method according to claim 11, wherein the time to perform the first pass in seconds is found by the formula:

$$\text{FirstPass}_{seconds} = a + (b \times \text{nominal diameter}) + (c \times \text{nominal diameter})^2,$$

wherein a is in a range from 10 to 50 seconds, b is in a range from 10 to 25 seconds, c is in a range from 0.10 to 0.75 seconds and nominal diameter is a stated diameter of the workpiece.

17. The method according to claim 11, wherein the time to perform first root pass in seconds is found by the formula:

$$\text{FirstPass}_{seconds} = 44.5942 + (19.6200 \times \text{nominal diameter}) + (0.522950 \times \text{nominal diameter})^2,$$

wherein nominal diameter is a stated diameter of the workpiece.

18. The method according to claim 11, wherein a total time to perform a multi-pass welding procedure is found by the formula:

$$\text{TotalTime}_{seconds} = x + (y \times \text{nominal diameter}) + (z \times \text{nominal diameter})^2,$$

wherein x is in a range from 10 to 70 seconds, y is in a range from 10 to 40 seconds, z is in a range from 0.10 to 10 seconds and nominal diameter is a stated diameter of the workpiece.

19. The method according to claim 11, wherein a total time to perform a multi pass welding procedure is found by the formula:

$$\text{TotalTime}_{seconds} = 67.3598 + (33.8308 \times \text{nominal diameter}) + (5.67906 \times \text{nominal diameter})^2,$$

wherein nominal diameter is a stated diameter of the workpiece.

20. The method according to claim 11, wherein the second pass is started at a location different from the starting location of the first pass.

21. The method according to claim 20, wherein the starting position of the second pass is 180° from the starting location of the first pass.

22. The method according to claim 1, wherein the control program causes the welding system to perform a first welding pass, wherein after the first pass, the welding torch is moved a preprogrammed vertical distance away from the workpiece.

23. The method according to claim 1, wherein the robotic welding system is provided with six degrees of movement via the robotic welder arm.

24. The method according to claim 23, wherein the integrated motor provides a seventh degree of movement to the robotic welding system.

25. A method of automatically welding a substantially cylindrical workpiece via a robotic welding system, the method comprising:

loading a substantially cylindrical workpiece to a workpiece support, positioning a robot arm holding a welder to a start position, relative to the position of the workpiece, inputting to a robot controller, via a robotic interface, a diameter of the workpiece, selecting, automatically by the robot controller, a control program, from a family of control programs stored in the robot controller, configured to control the robotic welding system to weld a workpiece having a diameter substantially equal to the input diameter size, initiating operation of the selected control program including,
   (i) moving the robot arm, carrying the welder, a preprogrammed horizontal distance towards a bevel of the workpiece,
   (ii) undertaking a welding procedure by the welder, including initiating operation of the welding torch,
   (iii) moving the welder in a pattern prescribed by the control program, and
   (iv) moving the workpiece and welder relative to each other so as to perform the welding operation as determined by the control program;

operating a manipulator to provide a manually provided refinement to operation of the control program, wherein the control program continues operation during operation of the manipulator.

* * * * *